(12) United States Patent
Ohtomo et al.

(10) Patent No.: US 11,940,274 B2
(45) Date of Patent: Mar. 26, 2024

(54) TILT DETECTING DEVICE AND SURVEYING INSTRUMENT

(71) Applicant: TOPCON Corporation, Tokyo-to (JP)

(72) Inventors: Fumio Ohtomo, Saitama (JP); Nobuyuki Nishita, Tokyo-to (JP); Kaoru Kumagai, Tokyo-to (JP)

(73) Assignee: TOPCON Corporation, Tokyo-to (JP)

( * ) Notice: Subject to any disclaimer, the term of this patent is extended or adjusted under 35 U.S.C. 154(b) by 725 days.

(21) Appl. No.: 17/070,966

(22) Filed: Oct. 15, 2020

(65) Prior Publication Data
US 2021/0116241 A1    Apr. 22, 2021

(30) Foreign Application Priority Data

Oct. 16, 2019   (JP) ................................ 2019-189590

(51) Int. Cl.
*G01C 15/00*   (2006.01)

(52) U.S. Cl.
CPC ................................ *G01C 15/008* (2013.01)

(58) Field of Classification Search
CPC ................................ G01C 15/008; G01C 9/06
See application file for complete search history.

(56) References Cited

U.S. PATENT DOCUMENTS

| 10,048,377 B2 | 8/2018 | Ohtomo et al. | |
| 2006/0161363 A1* | 7/2006 | Shibasaki | G01C 19/5607 |
| | | | 702/94 |
| 2012/0130667 A1* | 5/2012 | Fukushima | G01C 19/00 |
| | | | 73/1.37 |
| 2014/0088906 A1 | 3/2014 | Wilson | |
| 2014/0352400 A1 | 12/2014 | Barrilado et al. | |
| 2016/0238708 A1 | 8/2016 | Ohtomo et al. | |
| 2017/0131404 A1 | 5/2017 | Ohtomo et al. | |
| 2017/0138730 A1 | 5/2017 | Ohtomo et al. | |
| 2017/0168142 A1* | 6/2017 | Kumagai | G01S 17/66 |
| 2018/0052232 A1 | 2/2018 | Ohtomo et al. | |

(Continued)

FOREIGN PATENT DOCUMENTS

| JP | 2014-232096 A | 12/2014 |
| JP | 2016-151423 A | 8/2016 |
| JP | 2017-90244 A | 5/2017 |

(Continued)

*Primary Examiner* — Catherine T. Rastovski
*Assistant Examiner* — Yossef Korang-Beheshti
(74) *Attorney, Agent, or Firm* — NIELDS, LEMACK & FRAME, LLC

(57) ABSTRACT

A tilt detecting unit has a tilt sensor and is rotatably supported by an inner frame through a second shaft orthogonal to a first shaft, a first encoder is provided on the first shaft, a second encoder is provided on the second shaft, motors are provided on the respective shafts, an arithmetic processing module drives the respective motors so that the tilt sensor detects the horizontality based on a signal issued by the tilt sensor, calculates a tilt of the outer frame based on the outputs from the first and second encoders when the tilt sensor detects the horizontality, reverses the tilt detecting unit 180° at least once based on the outputs from the respective encoders in a stationary state of the tilt detecting device, and performs the calibration of the tilt sensor based on the detection signals output from the tilt sensor before and after the reversal.

8 Claims, 9 Drawing Sheets

(56) References Cited

U.S. PATENT DOCUMENTS

2018/0217263 A1* 8/2018 Ohtomo .............. G01C 15/002

FOREIGN PATENT DOCUMENTS

| JP | 2017-96629 A | 6/2017 | | |
|----|----|----|----|----|
| JP | 2017-106813 A | 6/2017 | | |
| JP | 2018-28464 A | 2/2018 | | |
| JP | 6541365 B2 | 7/2019 | | |
| WO | WO-2019151292 A1 * | 8/2019 | ............. | G01C 11/02 |

* cited by examiner

REPEAT PITCHING AND ROLLING
AS 180° ROTATION

ROTATE 90°
AROUND Y AXIS
IN CLOCKWISE DIRECTION

FURTHER
ROTATE 180°
AROUND Y AXIS

90° COUNTERCLOCKWISE
ROTATION AROUND X AXIS

90° CLOCKWISE
ROTATION
AROUND Y AXIS

90° COUNTERCLOCKWISE
ROTATION AROUND
X AXIS (180°)

90° CLOCKWISE
ROTATION AROUND
Y AXIS (180°)

90° COUNTERCLOCKWISE
ROTATION AROUND
X AXIS (270°)

90° CLOCKWISE
ROTATION AROUND
Y AXIS (270°)

90° COUNTERCLOCKWISE
ROTATION AROUND
X AXIS (360°)

90° CLOCKWISE
ROTATION AROUND
Y AXIS (360°)

TILT DETECTING DEVICE AND SURVEYING INSTRUMENT

BACKGROUND OF THE INVENTION

The present invention relates to a tilt detecting device using an acceleration sensor and to a surveying instrument including the tilt detecting device.

In a precision device such as a surveying instrument, in order to level a device or measure a tilt of a device, a tilt detecting device is provided.

There are a tilt sensor which uses a tilt of a free liquid surface or a movement of an air bubble sealed in liquid as a tilt detecting device for detecting a highly accurate horizontality and a small tilt, or a acceleration sensor detecting a dynamic tilt with a high responsiveness, and the like.

The tilt sensor detects a highly accurate horizontality but has a poor responsiveness, and it is difficult to use the tilt sensor in a dynamic device. Further, in the acceleration sensor, a high responsiveness is guaranteed, however a drift due to an environmental change (a temperature, a pressure, a humidity, and the like) or a change over time has become a problem, and has a problem of a lack of the stability.

Thus, in Japanese Patent No. 6541365, the present applicant has realized an attitude detecting device which includes a tilt sensor and an acceleration sensor and is capable of accurately detecting a tilt angle while guaranteeing a high responsiveness.

In order that the attitude detecting device determines the true horizontality or verticality, the attitude detecting device is checked by using a datum level or vertical collimator or the like.

SUMMARY OF THE INVENTION

It is an object of the present invention to provide a tilt detecting device capable of performing a calibration and a surveying instrument including the tilt detecting device.

To attain the object as described above, a tilt detecting device according to the present invention is provided in which an inner frame is provided inside an outer frame, a tilt detecting unit having a tilt sensor which detects a tilt from the horizontality is provided inside the inner frame, the inner frame is rotatably supported by the outer frame through a first shaft, the tilt detecting unit is rotatably supported by the inner frame through a second shaft orthogonal to the first shaft, includes a first encoder which is provided on the first shaft and detects a rotation angle between the outer frame and the inner frame, a second encoder which is provided on the second shaft and detects a rotation angle between the inner frame and the tilt detecting unit, motors provided on the respective shafts so as to rotate the respective shafts, and an arithmetic processing module which drives and controls the respective motors based on a detection result from the tilt sensor, in which the arithmetic processing module is configured to drive the respective motors based on a signal issued upon detecting a tilt by the tilt sensor such that the tilt sensor detects the horizontality and to calculate a tilt of the outer frame based on the outputs from the first and second encoders when the tilt sensor detects the horizontality, and the arithmetic processing module is configured to reverse the tilt detecting unit 180° at least once based on the outputs from the respective encoders in relation to the first shaft and the second shaft in a stationary state of the tilt detecting device, and to perform the calibration of the tilt sensor based on the detection signals output from the tilt sensor before and after the reversal.

Further, in the tilt detecting device according to a preferred embodiment, the tilt sensor is an acceleration sensor.

Further, in the tilt detecting device according to a preferred embodiment, the arithmetic processing module is configured to rotate the tilt detecting unit 90° in relation to at least one of the first shaft and the second shaft based on an output from the encoder on the one shaft in a stationary state of the tilt detecting device, reverse the tilt detecting unit 180° on the other shaft, and perform the calibration of the tilt sensor based on the detection signals output from the tilt sensor before and after the reversal.

Further, in the tilt detecting device according to a preferred embodiment, the arithmetic processing module is configured to, in a state where the tilt detecting device is stationary, a) rotate the tilt detecting unit 90° around the first shaft, b) then rotate the same 90° around the second shaft, c) then rotate the same 90° around the first shaft, d) then rotate the same 900 around the second shaft, e) then rotate the same 90° around the first shaft, f) then rotate the same 90° around the second shaft, g) then rotate the same 90° around the first shaft, h) then rotate the same 90° around the second shaft, perform the calibration of the tilt sensor for the first shaft and the second shaft based on the detection signals of the tilt sensor before and after each 180° reversal of the tilt detecting unit on the first shaft and the second shaft in a process of rotating the tilt detecting unit around each shaft in the same direction in the 90° increments, and perform the calibration for a third shaft based on the detection signals of the tilt sensor before and after the 180° reversal around the third shaft orthogonal to the first shaft and the second shaft.

Further, in the tilt detecting device according to a preferred embodiment, the arithmetic processing module is configured to slightly move the tilt detecting unit, and perform a calibration of the detection sensitivity of the tilt sensor based on a detection result of the tilt sensor obtained in a slightly moving state and the detection results of the first encoder and the second encoder.

Furthermore, in a surveying instrument according to a preferred embodiment, the surveying instrument includes a measuring unit which performs the electronic distance measurement, an optical axis deflector which deflects a distance measuring optical axis and sights the distance measuring light on a measuring point, a measuring direction detector which detects a sighting direction of the distance measuring optical axis, any of the above-described tilt detecting devices, and an arithmetic control module, in which the arithmetic control module is configured to acquire the three-dimensional coordinates of the measuring point based on a distance measurement result of the measuring unit and a detection result of the measuring direction detector and convert the three-dimensional coordinates into the three-dimensional coordinates with respect to the horizontality based on a detection result of the tilt detecting device.

According to the present invention, in the tilt detecting device, an inner frame is provided inside an outer frame, a tilt detecting unit having a tilt sensor which detects a tilt from the horizontality is provided inside the inner frame, the inner frame is rotatably supported by the outer frame through a first shaft, the tilt detecting unit is rotatably supported by the inner frame through a second shaft orthogonal to the first shaft, a first encoder which detects a rotation angle between the outer frame and the inner frame is provided on the first shaft, a second encoder which detects a rotation angle between the inner frame and the tilt detecting unit is provided on the second shaft, the tilt detecting device including the motors provided on the respective shafts so that the respective shafts are rotated, and an arithmetic processing module which drives and controls the respective motors based on a detection result from the tilt sensor, in which the arithmetic processing module is configured to drive the respective motors so that the tilt sensor detects the horizontality based on a signal issued upon detecting a tilt by the tilt sensor and to calculate a tilt of the outer frame based on the outputs from the first and second encoders when the tilt sensor detected the horizontality, and the arithmetic processing module is configured to reverse the tilt detecting unit 180° at least once based on the outputs from the respective encoders in relation to the first shaft and the second shaft in a stationary state of the tilt detecting device, and to perform the calibration of the tilt sensor based on the detection signals output from the tilt sensor before and after the reversal. As a result, by adopting a simple process, the calibration of the tilt detecting device is capable of being easily performed, and the calibration is capable of being performed during the measurement.

Further, according to the present invention, a surveying instrument includes a measuring unit which performs the electronic distance measurement, an optical axis deflector which deflects a distance measuring optical axis and sights the distance measuring light on a measuring point, a measuring direction detector which detects a sighting direction of the distance measuring optical axis, any of the above-described tilt detecting devices, and an arithmetic control module, in which the arithmetic control module is configured to acquire the three-dimensional coordinates of the measuring point based on a distance measurement result of the measuring unit and a detection result of the measuring direction detector and convert the three-dimensional coordinates into the three-dimensional coordinates with respect to the horizontality based on a detection result of the tilt detecting device. As a result, by adopting a simple process, the calibration of the tilt detecting device is capable of being easily performed, the calibration is capable of being performed during the measurement, and the surveying instrument including the tilt detecting device with highly accurate is provided.

DETAILED DESCRIPTION OF THE PREFERRED EMBODIMENT

A description will be given below on an embodiment of the present invention by referring to the attached drawings.

Figure 1:
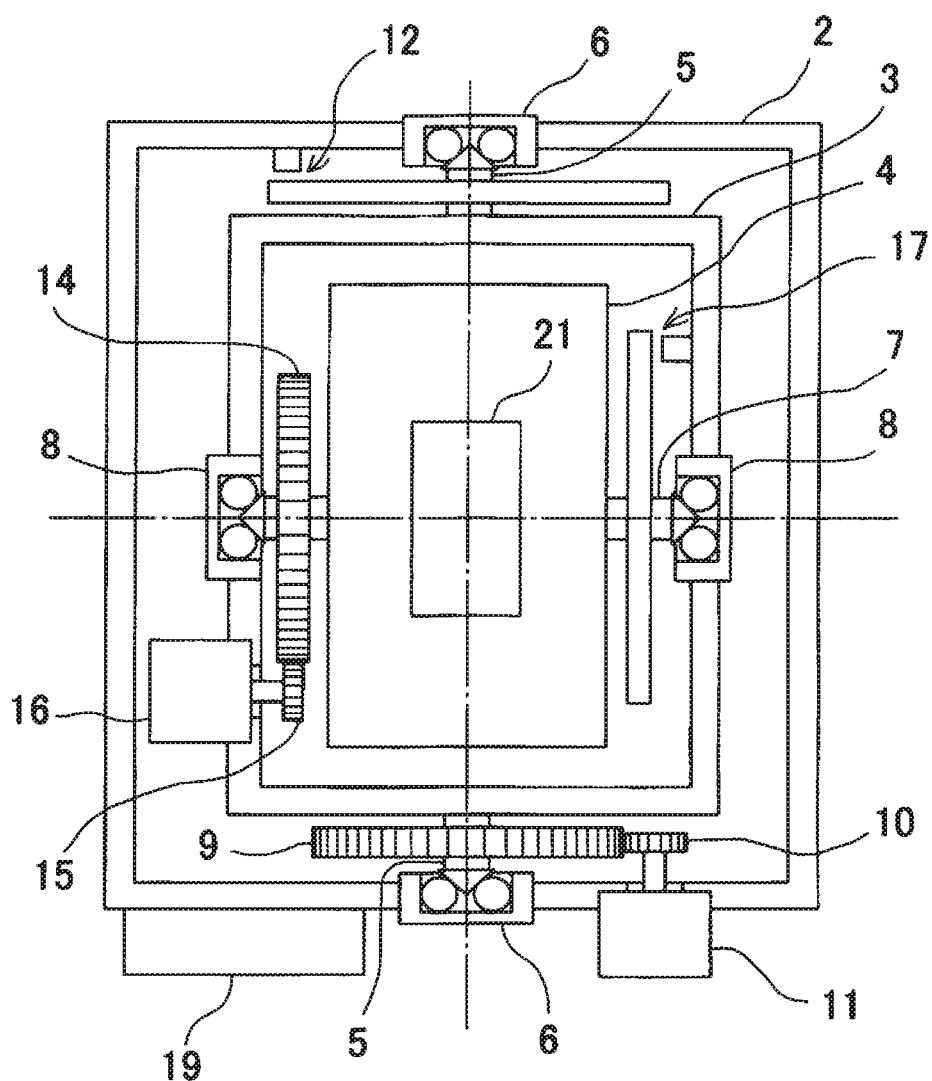
FIG. 1 is a schematical plan figure to show a tilt detecting device according to an embodiment of the present invention.
Figure 2:
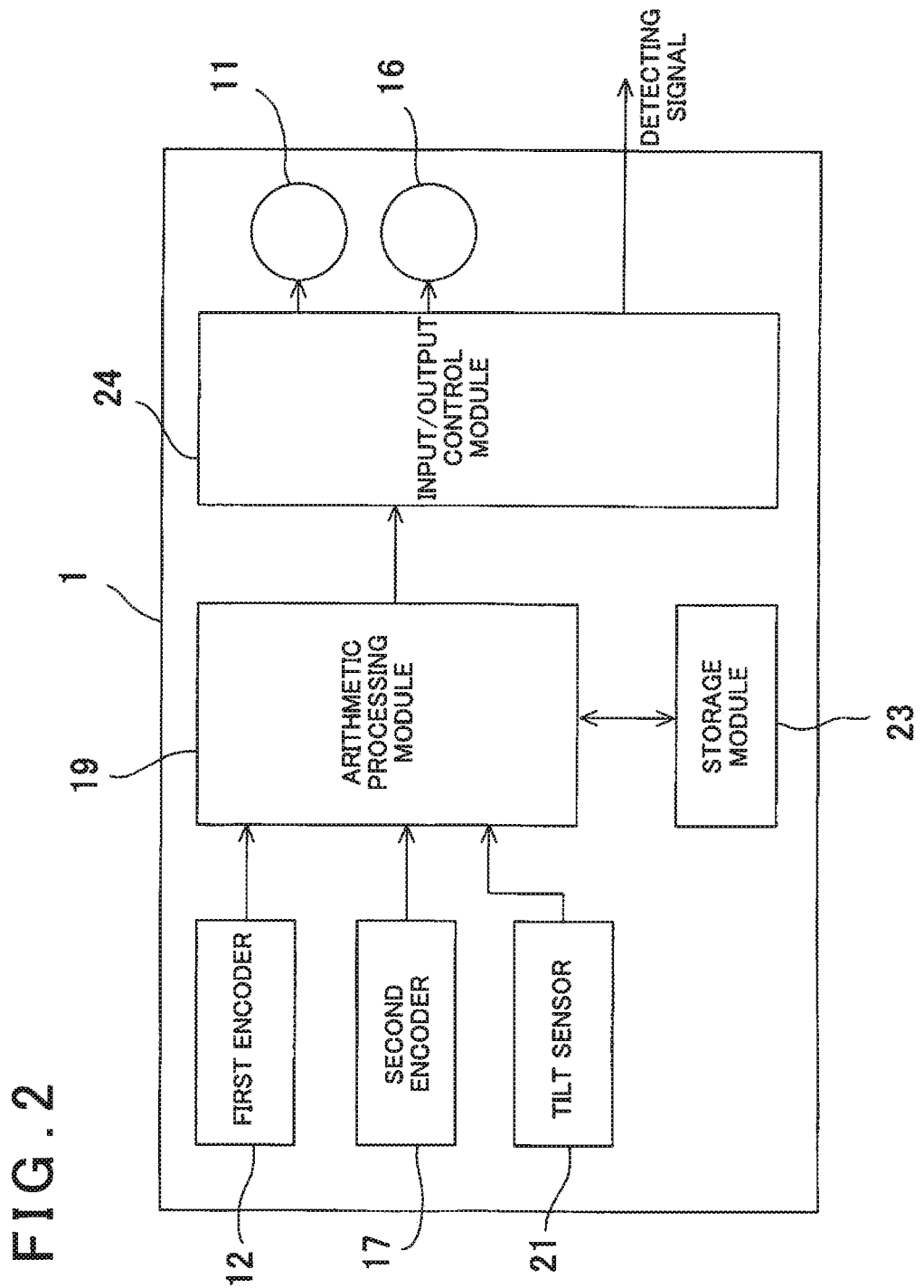
FIG. 2 is a schematical block diagram to show the tilt detecting device.

FIG. 1 and FIG. 2 are the schematical diagrams of a tilt detecting device according to an embodiment of the present invention.

FIG. 1 is a schematical plan figure showing a tilt detecting device 1 according to an embodiment of the present invention, and FIG. 2 is a schematical block diagram of the tilt detecting device 1 according to the embodiment. It is to be noted that, in the following description, the up and down and the left and right of the tilt detecting device 1 are referred to as the up and down and the left and right in the drawings for the convenience.

An inner frame 3 with a rectangular frame shape is provided inside an outer frame 2 with a rectangular frame shape. A tilt detecting unit 4 is provided inside the inner frame 3.

Further, in a case where the tilt detecting device 1 is provided in an apparatus of which tilt should be detected, the outer frame 2 is mounted to a structural member such as a frame which reflects a tilt of the apparatus.

The first shafts 5, 5 are provided to protrude from an upper surface and a lower surface of the inner frame 3. The first shafts 5, 5 are rotatably supported by the outer frame 2 via the bearings 6, 6 provided on the outer frame 2. The first shafts 5, 5 have a first axis, and the inner frame 3 is capable of rotating 360° around the first shafts 5, 5.

A second shaft 7 is provided to the tilt detecting unit 4. Both the end portions of the second shaft 7 are rotatably fitted in the bearings 8, 8 provided in the inner frame 3. The tilt detecting device 4 is rotatably supported by the inner frame 3 via the second shaft 7. The second shaft 7 has a second axis orthogonal to the first axis, and the tilt detecting device 4 is capable of rotating 360° around the second shaft 7.

Thus, the tilt detecting unit 4 is supported in such a manner that the tilt detecting unit 4 is capable of freely rotating in the two axial directions with respect to the outer frame 2, and a mechanism for rotatably supporting the inner frame 3 and a mechanism for rotatably supporting the tilt detecting unit 4 constitute a gimbal mechanism. Thus, the tilt detecting unit 4 is supported with respect to the outer frame 2 via the gimbal mechanism. Further, since there is no mechanism which restricts the rotation of the inner frame 3, the tilt detecting unit 4 is configured to be freely rotatable in all directions to the outer frame 2.

One of the first shafts 5, 5, e.g., the lower first shaft 5 has a first driven gear 9 fitted thereon, and a first driving gear 10 meshes with the first driven gear 9. Further, a first motor 11 is provided on a lower surface of the outer frame 2, and the first driving gear 10 is fitted on an output shaft of the first motor 11.

A first encoder 12 is provided to the other of the first shafts 5, 5. The first encoder 12 is configured to detect a rotation angle in a lateral direction of the inner frame 3 with respect to the outer frame 2.

A second driven gear 14 is fitted on one end portion of the second shaft 7, and a second driving gear 15 meshes with the second driven gear 14. Further, a second motor 16 is provided on a side surface (a left side surface in the drawing) of the inner frame 3, and the second driving gear 15 is fitted on an output shaft of the second motor 16.

A second encoder 17 is provided to the other end portion of the second shafts 7. The second encoder 17 is configured to detect a rotation angle in a longitudinal direction of the tilt detecting unit 4 with respect to the inner frame 3.

The first encoder 12 and the second encoder 17 are electrically connected to an arithmetic processing module 19.

The tilt detecting unit 4 has a tilt sensor 21, and the tilt sensor 21 is electrically connected to the arithmetic processing module 19.

The tilt sensor 21 detects a tilt, and it is, e.g., an acceleration sensor. Further, the acceleration sensor is configured to detect tilts of horizontal two axes orthogonal to each other and a tilt of one axis in a vertical direction, which are the tilts in three axes directions in total. Here, the horizontal two axes are the first shaft 5 and the second shaft 7 in FIG. 1, the rotation (a tilt) around the first shaft 5 is defined as the pitching, and the rotation (a tilt) around the second shaft 7 is defined as the rolling.

A further description will be given on the tilt detecting device 1 by referring to FIG. 2.

The tilt detecting device 1 further includes a storage module 23 and an input/output control module 24 besides the first encoder 12, the second encoder 17, the tilt sensor 21, the arithmetic processing module 19, the first motor 11, and the second motor 16.

As the arithmetic control module 19, a CPU dedicated to the present embodiment, a general-purpose CPU, an embedded CPU, a microprocessor, or the like is used. Further, as the storage module 23, a semiconductor memory such as a RAM, a ROM, a Flash ROM, or a DRAM is used.

In the storage module 23 are stored the programs, e.g., an arithmetic program for detecting a tilt of the tilt detecting unit 4 with respect to the outer frame 2, a drift calibration program for calibrating a drift of the tilt sensor 21, and a program for driving and controlling the first motor 11 and the second motor 16, and also stored the data, e.g., the arithmetic data (i.e., the detected tilt angle data).

The input/output control module 24 drives the first motor 11 and the second motor 16 based on a control command output from the arithmetic processing module 19, and outputs the tilt angle data calculated by the arithmetic processing module 19.

The tilt sensor 21 detects a tilts with respect to the horizontality and the tilt directions with respect to the horizontal two axes, and also detects the tilts of the rotating directions (the pitching, the rolling) around the respective axes 5 and 7. Further, the pitching is a rotating direction (a tilt direction) detected by the first encoder 12, and the rolling is a rotating direction (a tilt direction) detected by the second encoder 17.

The arithmetic processing module 19 calculates a tilt angle and a tilt direction based on a detection result from the tilt sensor 21. Further, the arithmetic processing module 19 calculates a rotation angle of the first encoder 12 and a rotation angle of the second encoder 17 corresponding to the tilt angle and the tilt direction.

It is to be noted that the tilt detecting device 1 is set in such a manner that the tilt sensor 21 detects the horizontality when the outer frame 2 is horizontally installed, and set in such a manner that both an output from the first encoder 12 and an output from the second encoder 17 indicate a reference position (a rotation angle 0°).

A description will be given below on a function of the tilt detecting device 1.

The outer frame 2 is coupled with the inner frame 3 via the first motor 11, the first driving gear 10 and the first driven gear 9, and the inner frame 3 and the tilt detecting unit 4 are in a coupled state via the second motor 16, the second driving gear 15 and the second driven gear 14, namely, a state where the rotation is restrained. Therefore, from a state where both an output from the first encoder 12 and an output from the second encoder 17 indicate the reference position (the rotation angle 0°), when the tilt detecting device 1 (the outer frame 2) tilts with respect to the horizontality, the tilt detecting unit 4 and the outer frame 2 integrally tilt, and the tilt sensor 21 outputs a signal corresponding to the tilt.

The arithmetic processing module 19 calculates a tilt angle and a tilt direction based on a signal from the tilt sensor 21. Further, the arithmetic processing module 19 calculates the rotation amounts of the first motor 11 and the second motor 16 for making the tilt angle and the tilt direction to 0 based on the calculation results, and issues a driving command for rotating each of the first motor 11 and the second motor 16 by a calculated rotation amount via the input/output control module 24.

By the driving command, the first motor 11 and the second motor 16 are driven so that the tilts at an opposite angle and in an opposite direction of the calculated tilt angle and tilt direction can be achieved. The driving amounts (the rotation angles) of the motors at this moment are detected by the first encoder 12 and the second encoder 17, and the driving of the first motor 11 and the second motor 16 is stopped when the rotation angles become the calculation results.

Further, the rotations of the first motor 11 and the second motor 16 are finely adjusted so that the tilt sensor 21 detects the horizontality.

In this state, the tilt detecting unit 4 is controlled horizontally in a state where the outer frame 2 tilts.

Therefore, in order to horizontalize the tilt detecting unit 4, the tilt angles and the tilt directions of the inner frame 3 and the tilt detecting unit 4, as tilted by the first motor 11 and the second motor 16, are determined based on the rotation angles detected by the first encoder 12 and the second encoder 17.

The arithmetic processing module 19 calculates a tilt angle and a tilt direction of the tilt detecting device 1 based on the detection results from the first encoder 12 and the second encoder 17 when the tilt sensor 21 detected the horizontality. This calculation result indicates an attitude of the tilt detecting device 1 after the tilt.

Thus, the arithmetic processing module 19 can calculate the tilt angle and the tilt direction of the outer frame 2 with respect to the horizontality based on the detection results of the first encoder 12 and the second encoder 17. Further, in case of setting the outer frame 2 at a predetermined angle and in a predetermined direction to the horizontality, the arithmetic processing module 19 can perform setting based on the detection results of the first encoder 12 and the second encoder 17.

That is, a relationship between the tilt sensor 21 and the outer frame 2 can be managed based on the detection results of the first encoder 12 and the second encoder 17.

The arithmetic processing module 19 outputs, as a detection signal (the tilt angle data) of the tilt detecting device 1, the tilt angle and the tilt direction calculated based on the rotation angles detected by the first encoder 12 and the second encoder 17.

Further, when a detection signal of the tilt sensor 21 is fed back to the arithmetic processing module 19 in real time and the first motor 11 and the second motor 16 are controlled in such a manner that the horizontality of the tilt sensor 21 is maintained, a dynamic change in tilt of the outer frame 2 can be detected in real time. Thus, a tilt of the apparatus, on which the tilt detecting device 1 is provided, can be detected.

Further, by detecting a change in tilt in real time, the tilt sensor 21 is used constantly in the vicinity of the horizontality (a tilt angle 0) and an influence of a linearity of a detection sensitivity of the tilt sensor 21 can be neglected or can be reduced vanishingly. Further, when the arithmetic processing module 19 determines a stationary state of the tilt detecting device 1 based on a detection result from the tilt sensor 21 and performs the later-described calibration, the stability of the tilt sensor 21 can be also guaranteed.

As described above, the tilt sensor 21 is subject to a drift due to environmental changes (a temperature, an air pressure, the humidity, and the like) and a change over time.

In the present embodiment, by performing the calibration to correct or remove a drift component at the predetermined time intervals, an accuracy and a stability of the tilt sensor improve.

A description will be given below on the calibration to remove the drift component.

Figure 3:
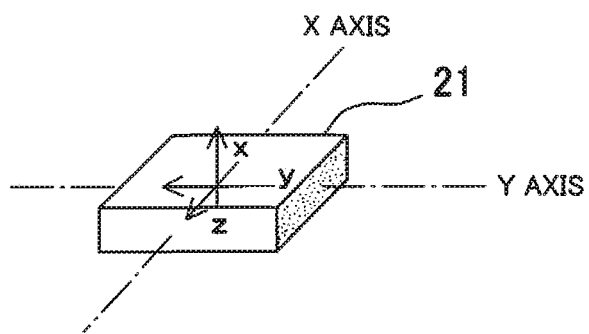
FIG. 3 is a schematical diagram of a tilt sensor in the tilt detecting device.

FIG. 3 is a diagram provided by extracting and schematizing the tilt detecting unit 4 in FIG. 1.

In FIG. 3, and an X axis corresponds to the first axis 5, a Y axis corresponds to the second axis 7, and an axis perpendicular to a plane including the X axis and the Y axis is a Z axis. Further, a rotation around the X axis is pitching, and a rotation around the Y axis is rolling. Further, the arrows x, y, and z shown in the tilt sensor 21 indicate the directions of the tilt sensor 21.

In the present embodiment, the motor and the encoder are coupled with each of the X axis and the Y axis. Thus, the tilt detecting unit 4 can be forcibly and accurately rotated 180° in relation to the X axis and the Y axis, respectively.

Figure 4A:
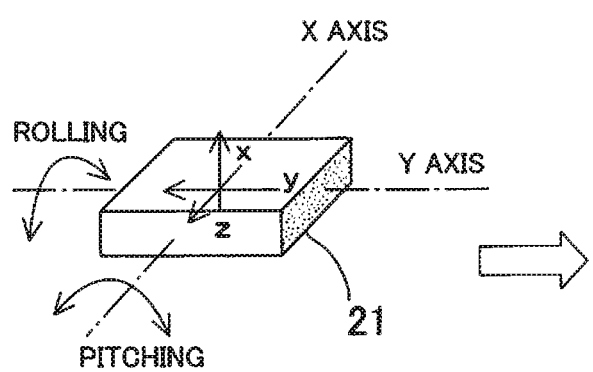
FIG. 4A and FIG. 4B are the explanatory drawings of the calibration of the two axes XY of the tilt sensor.

FIG. 4A shows the start of the calibration, and a tilt angle at that time is measured.

Then, performing pitching 180° around the X axis and further performing rolling 180° around the Y axis, thereby front-rear and left-right of the tilt detecting unit 4 are reversed, and also the directions of the X and Y axes are reversed 180°, respectively. The reversal on either the X axis or the Y axis will be hereinafter referred to as the uniaxial reversal or X axis reversal or Y axis reversal, and the reversal on both the X and Y axes will be referred to as the biaxial reversal.

Figure 4B:
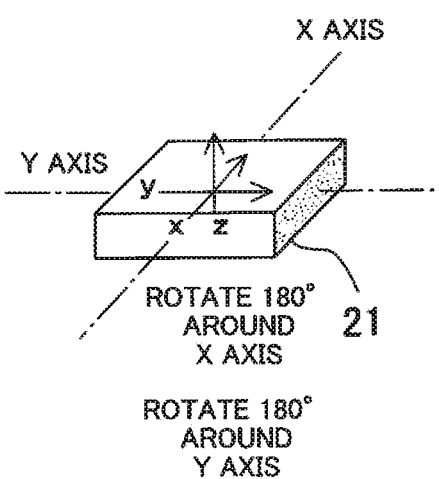

A state where the biaxial reversal has occurred from the state of FIG. 4A is shown in FIG. 4B.

Performing pitching 1800 and further performing rolling 180°, the biaxial reversal occurs. When a difference between the tilt angles before and after performing the biaxial reversal is taken, a tilt angle difference with an offset (a long-term drift component) removed can be obtained.

This tilt angle difference before and after the biaxial reversal is a multiple of an actual tilt angle. Therefore, ½ of the tilt angle difference obtained by performing the biaxial reversal is the actual tilt angle.

Further, when each of the pitching and rolling is performed as the 180° rotation, an original attitude (each of the pitching and rolling performed as the 360° rotation) is restored.

Therefore, when each of the pitching and rolling as the 180° rotation is repeatedly performed and ½ of the tilt angle difference before and after the biaxial reversal is obtained, the long-term drift component can be always removed, and the accurate tilt angle can be obtained.

Further, even if the tilt angle has changed (when a tilt of the outer frame 2 has changed), the motors are driven in such a manner that the tilt sensor is always at zero or substantially zero, and hence it is possible to follow a change in tilt angle.

Figure 5:
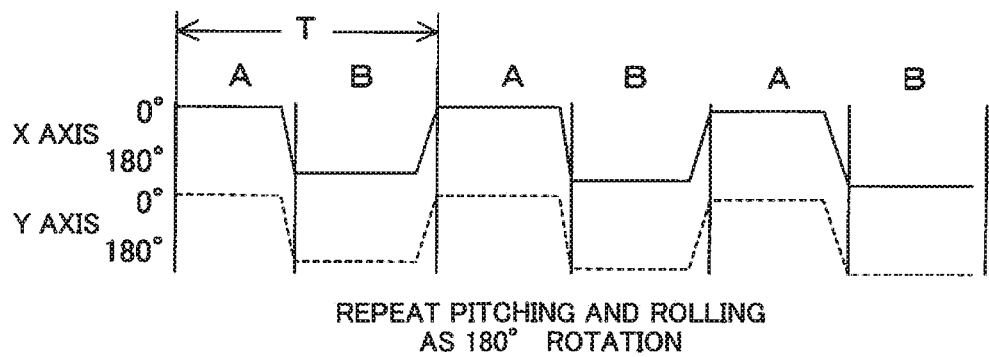
FIG. 5 is a diagram to show a flow of the calibration.

FIG. 5 is a diagram showing a state where the pitching and rolling as the 180° rotations are repeated.

It is to be noted that a cycle T of the pitching and the rolling is determined by a drift characteristics of the acceleration sensor to be used and an accuracy required by an apparatus in which the tilt detecting device 1 is provided.

For example, it is a time in which a drift of the acceleration sensor is not a problem, e.g., within 10 seconds.

That is, it is set in such a manner that a drift (an error) of the tilt sensor 21 which occurs in the set cycle T does not exceed a tolerance required by the apparatus.

Further, in a case where the calibration is performed, the tilt detecting device 1 must be in a stable state such as no fluctuation in the tilt angle within at least one cycle (preferably within a plurality of cycles).

The arithmetic processing module 19 may determine a stationary state of the tilt detecting device 1 based on a signal from the tilt sensor 21 and perform the calibration. Alternatively, the calibration may be performed at a discretion of a user of the tilt detecting device 1.

Further, as another method of the calibration, a zero-point offset value of the tilt sensor may be obtained by taking an average of the angles before and after the reversal measurement (an average value of A and B), and the offset value may be stored. Constantly performing the zero-point offset correction to the outputs from the tilt sensor by using the stored zero-point offset value, it is possible to measure an accurate tilt angle without carrying out a reversal every time a tilt measurement.

Further, the arithmetic processing module 19 slightly moves the tilt detecting unit 4 via the first motor 11 and the second motor 16, and slightly moves the tilt sensor 21 (the tilt detecting unit 4), and the states of the slight movements are detected by the tilt sensor 21, the first encoder 12, and the second encoder 17. In this case, when the arithmetic processing module 19 values an output of the tilt sensor 21 based on the detection results of the first encoder 12 and the second encoder 17, the detection sensitivity of the tilt sensor 21 can be also calibrated.

In the foregoing embodiment, the calibration with respect to the X axis and the Y axis has been described, but the calibration with respect to the Z axis can be performed by the same method. Further, the reversal of 180° may be performed for each of the X axis and the Y axis, and the calibration may be performed for each of the X axis and the Y axis.

Figure 6A:
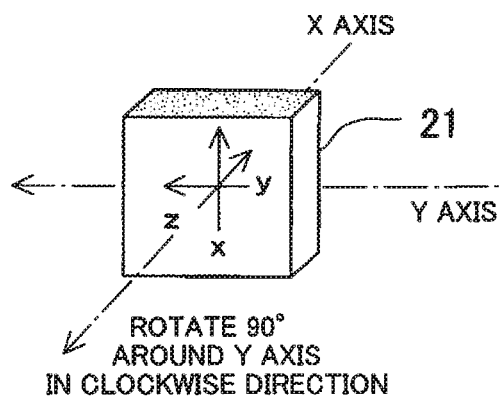
FIG. 6A and FIG. 6B are the explanatory drawings of the calibration of a Z axis of the tilt sensor.
Figure 6B:
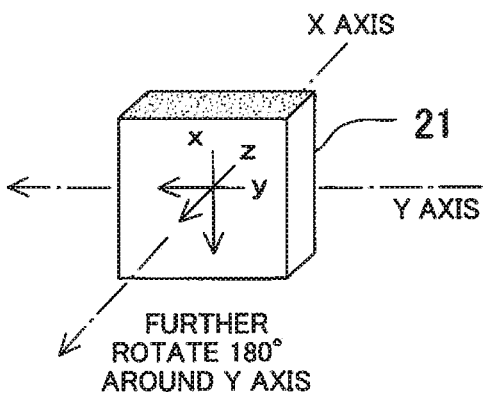

FIG. 6A and FIG. 6B show an example.

FIG. 6A shows a state where the 90° clockwise rotation around the Y axis is performed from the state shown in FIG. 3.

In this state, the Z axis becomes horizontal, and it becomes possible for the tilt sensor 21 to detect a horizontal state of the Z axis. FIG. 6B shows a state where the 180° clockwise rotation is further performed around the Y axis from the state depicted in FIG. 6A. Since this 180° rotation reverses the Z axis, the calibration of the tilt sensor 21 concerning the Z axis can be performed in the same manner as described above.

It is to be noted that, needless to say, when the 90° rotation is performed around the X axis and the 180° rotation is further performed around the X axis in the same direction, the calibration of the tilt sensor 21 concerning the Z axis can be likewise performed.

Further, the calibrations with respect to the X, Y axes and the calibration with respect to the Z axis do not have to be performed at the same frequency. For example, the frequency of calibration may be changed, such as performing the calibration for the X and Y axes twice and performing the calibration for the Z axis once. Regarding the setting of the frequency, the frequency may be set in consideration of the tolerance required by the apparatus and the stability of the tilt sensor 21.

The description has been given above on the case where the calibrations concerning the X axis and the Y axis and the calibration concerning the Z axis are individually carried out. On the other hand, the calibrations concerning the X axis, the Y axis, and the Z axis can be also continuously performed in a series of operations.

The description will be given with reference to FIG. 7A to FIG. 7I and FIG. 8.

Figure 7A:
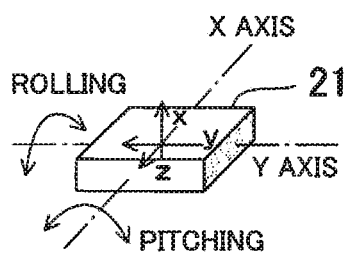
FIG. 7A, 7B, 7C, 7D, 7E, 7F, 7G, 7H and FIG. 7I are the explanatory drawings of a case where the calibration of the three axes XYZ of the tilt sensor is realized in the course of a series of flow.
Figure 7B:
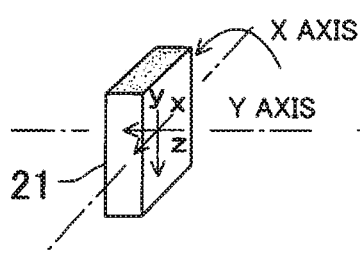
Figure 7C:
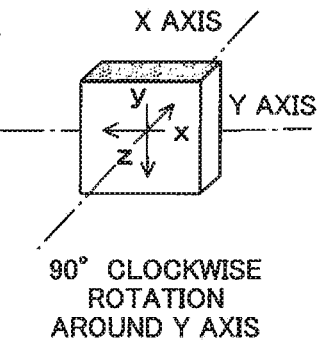
Figure 7D:
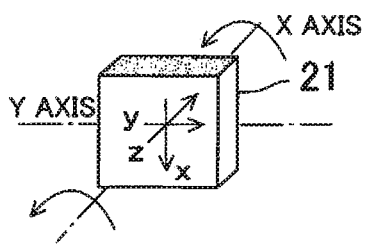

FIG. 7A shows a steady state. A state of FIG. 7B is provided when the tilt sensor 21 is rotated around the X axis 90° in the counterclockwise direction from the steady state of FIG. 7A, a state of FIG. 7C is provided when the same is further rotated around the Y axis 90° in the clockwise direction, a state of FIG. 7D is provided when the same is further rotated around the X axis 90° in the counterclockwise direction (the 180° counterclockwise rotation in total), a state of FIG. 7E is provided when the same is further rotated around the Y axis 90° in the clockwise direction (the 180° clockwise rotation in total), a state of FIG. 7F is provided when the same is further rotated around the X axis 90° in the counterclockwise direction (the 270° counterclockwise rotation in total), a state of FIG. 7G is provided when the same is further rotated around Y axis 90° in the clockwise direction (the 270° clockwise rotation in total), a state of FIG. 7H is provided when the same is further rotated around the X axis 90° in the counterclockwise direction (the 360° counterclockwise rotation in total), and a state of FIG. 7I is provided when the same is further rotated around the Y axis 90° in the clockwise direction (the 360° clockwise rotation in total).

When the 360° rotation is performed around each of the X axis and the Y axis in one direction, an original state (the steady state shown in FIG. 7A) is restored.

Figure 7E:
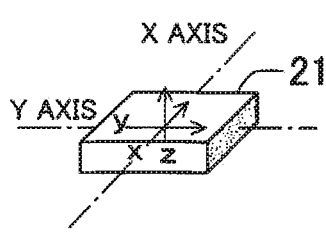
Figure 7F:
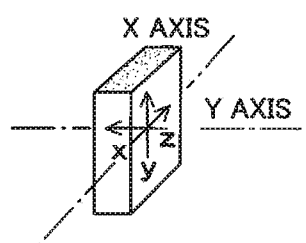
Figure 7G:
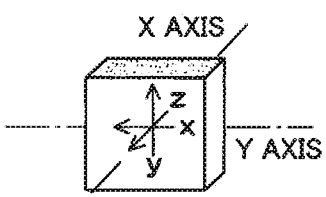

In a process of sequentially performing the rotation around each of the X axis and the Y axis at every 90°, both the directions x and y of the tilt sensor 21 in the state of FIG. 7E are reversed 180° from the state of FIG. 7A. Therefore, the calibrations in the x and y directions can be performed using the detection results in the state of FIG. 7A and the state of FIG. 7E of the tilt sensor 21. (See FIG. 8)

Figure 7H:
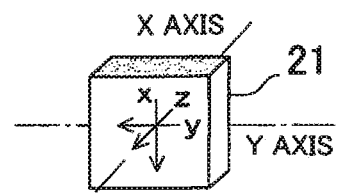
Figure 7I:
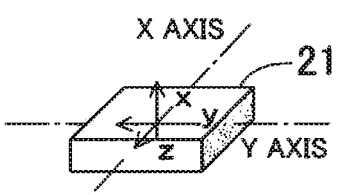
Figure 8:
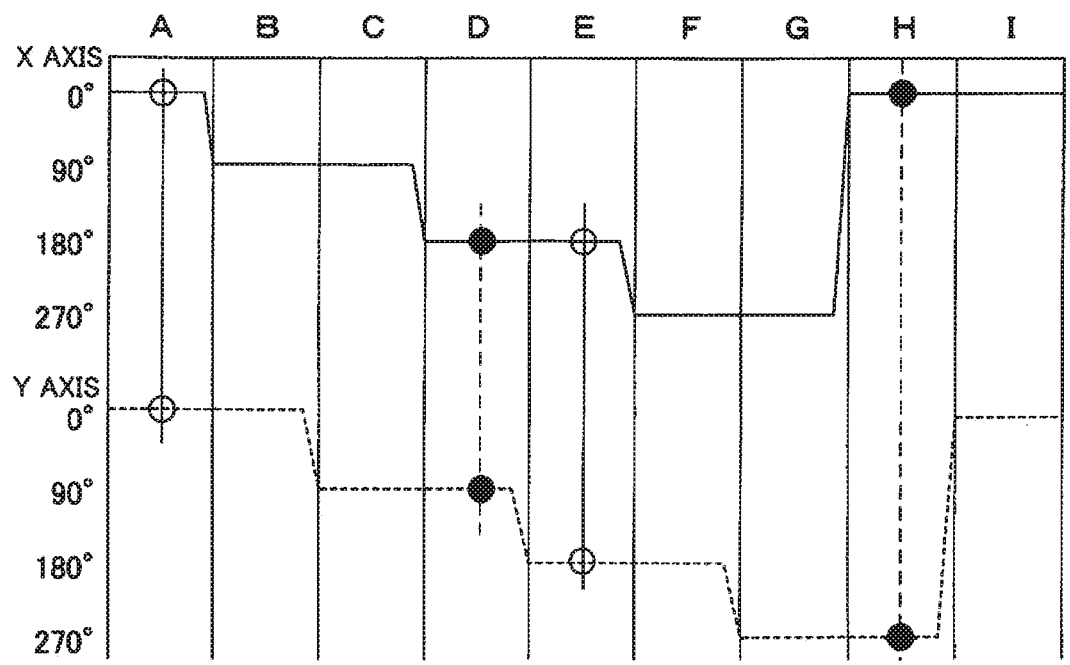
FIG. 8 is a diagram to show a flow of the calibration.

Further, in the state of FIG. 7D and the state of FIG. 7H, the z direction of the tilt sensor 21 is horizontal and reversed. Therefore, the calibration in the z direction can be performed using the detection results in the state of FIG. 7D and the state of FIG. 7H. (See FIG. 8)

Thus, when the tilt sensor 21 is alternately rotated around the X axis and the Y axis by 90° increments, the tilt sensor 21 can be continuously calibrated in the three directions of x, y, and z (the X axis, the Y axis, the Z axis).

A variety of rotation methods can be considered, and it is sufficient to obtain two attitudes of the tilt sensor 21 with each of x, y, and z being horizontal and reversed.

Figure 9:
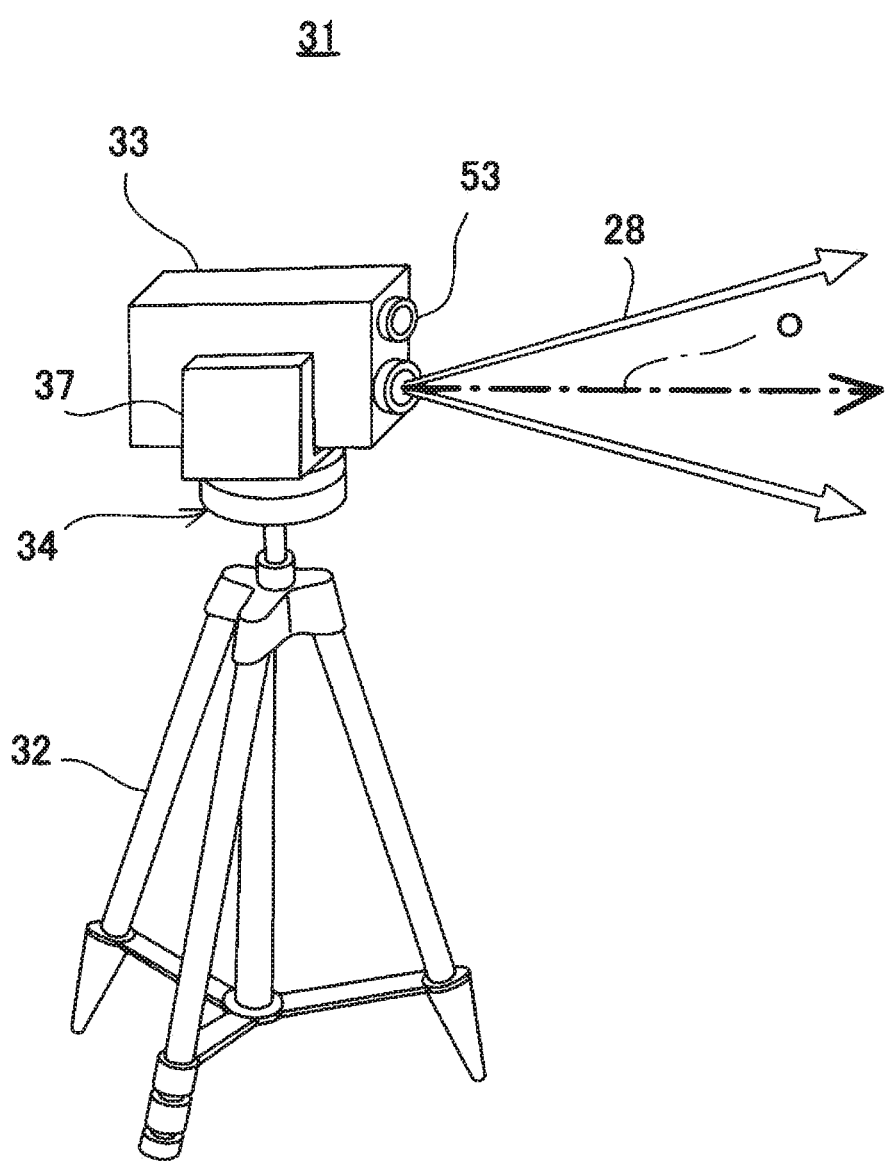
FIG. 9 is an overall perspective view of a surveying instrument according to the embodiment.

A description will be given on a surveying instrument system 31 including the tilt detecting device 1 according to this embodiment by referring to FIG. 9 to FIG. 11. In FIG. 9, O denotes a distance measuring optical axis in a state where an optical axis is not deflected, and a distance measuring optical axis 28 at this moment is determined as a reference optical axis O.

The surveying instrument system 31 mainly has a tripod 32 as a supporting device, a surveying instrument 33, and an installation base unit 34 which is a supporting unit for the surveying instrument 33.

The installation base unit 34 is mounted on an upper end of the tripod 32. The surveying instrument 33 is supported by the installation base unit 34 so that the surveying instrument 33 can rotate in an up-and-down direction and a left-and-right direction.

Figure 10:
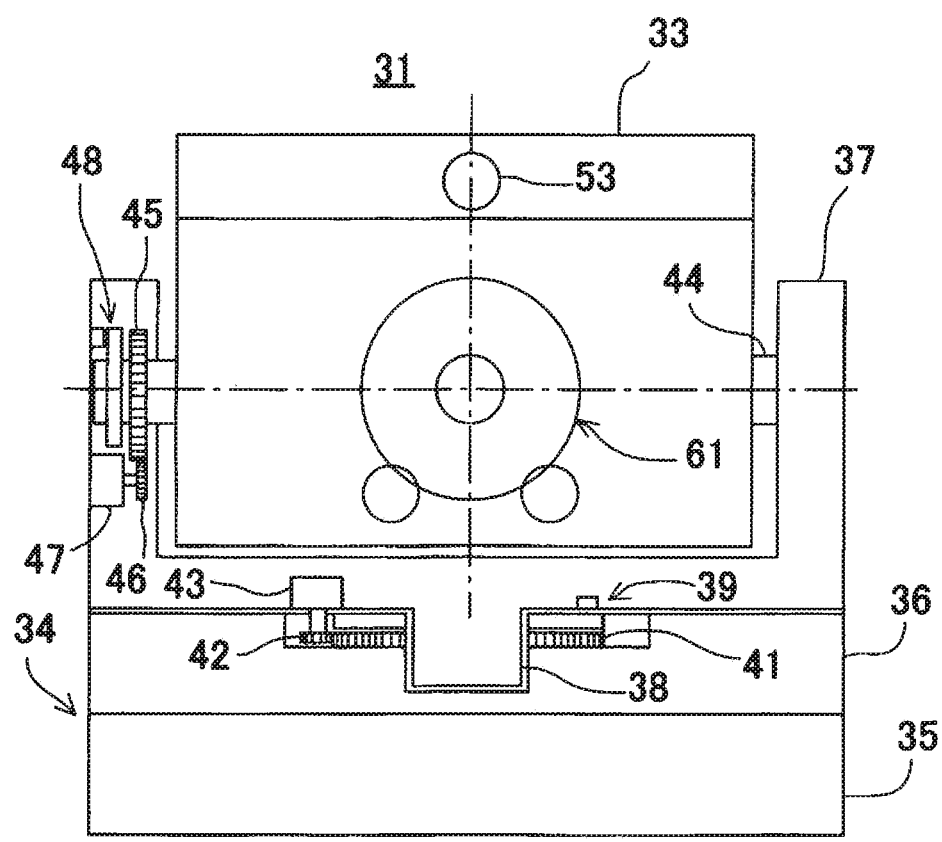
FIG. 10 is a front elevation of the surveying instrument.

As shown in FIG. 10, the installation base unit 34 has a base 35 fixed at the upper end of the tripod 32, a horizontal board 36 fixed and mounted on the base 35, and a frame unit 37 provided on the horizontal board 36 rotatably in the horizontal direction. The surveying instrument 33 is mounted to the frame unit 37 rotatably in the vertical direction.

A horizontal rotation shaft 38 is provided to protrude from a lower surface of the frame unit 37, and the horizontal rotation shaft 38 is rotatably fitted in the horizontal board 36 via a bearing (not shown). The frame unit 37 is rotatable around the horizontal rotation shaft 38 in the horizontal direction.

Further, a horizontal angle detector 39 (e.g., an encoder) which detects a horizontal angle (an angle in a rotating direction around the horizontal rotation shaft 38) is provided between the horizontal rotation shaft 38 and the horizontal board 36. A relative rotation angle in the horizontal direction of the frame unit 37 with respect to the horizontal board 36 is detected by the horizontal angle detector 39.

A horizontal rotation gear 41 is fixed to the horizontal board 36 concentrically with the horizontal rotation shaft 38, and a horizontal pinion gear 42 meshes with the horizontal rotation gear 41. A horizontal motor 43 is provided in the frame unit 37, and the horizontal pinion gear 42 is fixed to an output shaft of the horizontal motor 43.

The horizontal pinion gear 42 rotates by driving of the horizontal motor 43, and the horizontal pinion gear 42 revolves around the horizontal rotation gear 41. The frame unit 37 and the surveying instrument 33 integrally rotate around the horizontal rotation shaft 38 by a revolution of the horizontal pinion gear 42. Thus, the surveying instrument 33 is rotated in the horizontal direction by the horizontal motor 43.

The surveying instrument 33 is supported by the frame unit 37 via a vertical rotation shaft 44, and the surveying instrument 33 is rotatable around the vertical rotation shaft 44 in the vertical direction.

A vertical rotation gear 45 is fitted and fixed on one end of the vertical rotation shaft 44, and a pinion gear 46 meshes with the vertical rotation gear 45. The pinion gear 46 is fixed on an output shaft of a vertical motor 47 provided in the frame unit 37. When the vertical motor 47 is driven, the pinion gear 46 is rotated, and the surveying instrument 33 is rotated in the vertical direction via the vertical rotation gear 45 and the vertical rotation shaft 44.

Further, a vertical angle detector 48 (e.g., an encoder) which detects a vertical angle (an angle in a rotating direction with the vertical rotation shaft 44 as the center) is provided between the vertical rotation shaft 44 and the frame unit 37. A relative rotation angle in the vertical direction of the surveying instrument 33 to the frame unit 37 is detected by the vertical angle detector 48.

The horizontal motor 43 and the vertical motor 47 are driven by a first motor driver 57 (as described later), and the horizontal motor 43 and the vertical motor 57 are controlled so that a necessary rotation amount can be provided at a necessary timing by an arithmetic control module 54 (which will be described later) as a control module via the first motor driver 57.

A rotation amount of the horizontal motor 43 (i.e., a horizontal angle of the frame unit 37) is detected by the horizontal angle detector 39. A rotation amount of the vertical motor 47 (i.e., a vertical angle of the surveying instrument 33) is detected by the vertical angle detector 48.

Thus, the horizontal angle and the vertical angle of the surveying instrument 33 are detected by the horizontal angle detector 39 and the vertical angle detector 48 respectively, and the detection results are input to the arithmetic control module 54 respectively. It is to be noted that the horizontal motor 43 and the vertical motor 47 constitute a rotation driving module.

The horizontal angle detector 39 and the vertical angle detector 48 constitute an angle detector which detects a vertical rotation angle and a horizontal rotation angle of the surveying instrument 33, i.e., a direction angle detector.

A further description will be given on the surveying instrument 33 1 with reference to FIG. 11.

The surveying instrument 33 mainly includes a measuring unit 51, a tracking unit 52, a measuring direction image pickup module 53, the arithmetic control module 54, a main body storage module 55, the tilt detecting device 1, a measuring direction detector 56, the first motor driver 57, a second motor driver 58, an image processing module 59, a display unit 60 and an optical axis deflector 61. They are accommodated in a casing 62 and integrated.

Further, the outer frame 2 of the tilt detecting device 1 is fixed to the casing 62 or fixed to a structural member fixed to the casing 62, and the outer frame 2 is integrated with the casing 62, i.e., the surveying instrument 33.

As the arithmetic control module 54, a CPU dedicated to this embodiment, a general-purpose CPU, an embedded CPU, a microprocessor, or the like is used. Further, as the main body storage module 55, a semiconductor memory such as a RAM, a ROM, a Flash ROM, or a DRAM, a magnetic recording memory such as an HDD, or an optical recording memory such as a CDROM is used. Further, some of the functions of the arithmetic control module 54 may be allocated as the arithmetic processing module 19.

In the main body storage module 55 the various kinds of programs are stored, e.g., the programs to carry out this embodiment such as a distance measurement program, a tracking program, an image processing program, an optical axis deflection control program, and a program for performing a calibration of the tilt detecting device 1. The arithmetic control module 54 develops and executes the stored programs. Further, the various kinds of data, e.g., the measurement data and the image data are stored in the main body storage module 55.

The arithmetic control module 54 controls the optical axis deflector 61 via the second motor driver 58. Further, the arithmetic control module 54 controls the deflection of the distance measuring optical axis 28 via the optical axis deflector 61, and performs the integration control over the measuring unit 51 and the tracking unit 52, a synchronous control for the distance measurement, the image pickup, and the tracking, and the like.

The tilt detecting device 1 detects a tilt of the surveying instrument 33 with respect to the horizontality or the verticality, and a detection result is input to the arithmetic control module 54. Further, as the tilt detecting device 1, for example, an acceleration sensor as a sensor for detecting a tilt is used, and the acceleration sensor is calibrated at the predetermined time intervals or continuously. Therefore, a detection accuracy of the tilt detecting device 1 is maintained.

An optical axis of the tracking unit 52 is deflected by mirrors 65, 66, and the optical axis of the tracking unit 52 coincides with an optical axis of the measuring unit 51. The coinciding optical axes are determined as a distance measuring optical axis 28 hereinafter.

The optical axis deflector 61 is arranged on the distance measuring optical axis 28. A straight optical axis transmitted through the center of the optical axis deflector 61 is the reference optical axis O. The reference optical axis O coincides with the distance measuring optical axis 28 when the distance measuring optical axis 28 is not deflected by the optical axis deflector 61.

It is to be noted that, as the optical axis deflector 61, one disclosed in Japanese Patent Application Publication No. 2016-151423, Japanese Patent Application Publication No. 2017-90244, or Japanese Patent Application Publication No. 2017-106813 can be used.

The optical axis deflector 61 will be briefly described hereinafter.

The optical axis deflector 61 includes a pair of disk prisms 71, 72 constituted of the optical prisms. The disk prisms 71, 72 have the discoid shapes with the same diameter respectively, and the disk prism 71, 72 are concentrically arranged on the distance measuring optical axis 28 orthogonal to the distance measuring optical axis 28 and arranged in parallel each other at a predetermined interval. The disk prisms 71, 72 are provided rotatably around the reference optical axis O respectively, and the disk prisms 71, 72 are configured in such a manner that the disk prisms 71, 72 are separately and independently rotated by the motors. The motors are driven by the second motor driver 58, and configured so that the rotation angles, the rotating directions, the rotation speeds, and the like of the disk prisms 71, 72 are controlled by the arithmetic control module 54 via the second motor driver 58. Thus, by controlling the rotations of the disk prisms 71, 72, the distance measuring optical axis 28 can be deflected at an arbitrary angle from 0° to a maximum deflection angle (e.g., ±20°) with reference to the reference optical axis O.

The distance measuring module 51 has a function as an electronic distance meter, projects the distance measuring light 67 to a measuring point or an object to be measured, receives the reflected distance measuring light 68 from the measuring point or the object to be measured, and performs the electronic distance measurement based on a reciprocating time and the light speed of the distance measuring light.

Further, when the distance measuring optical axis 28 is deflected by the optical axis deflector 61, the sighting on the measuring point and a change of the measuring point are carried out.

The deflection of the distance measuring optical axis 28 by the optical axis deflector 61 enables the measurement in a deflection range of the optical axis deflector 61 with the reference optical axis O fixed (i.e., with the surveying instrument 33 fixed).

Further, when the disk prisms 71, 72 are continuously driven and continuously deflected while continuously irradiating the distance measuring light 67, a two-dimensional scan using the distance measuring light 67 can be performed in a predetermined pattern. Further, when the distance measuring light 67 is pulse-emitted and the distance measurement for each pulsed light is carried out, a point cloud data taken along a scan locus can be acquired.

The measuring direction detector 56 detects the respective rotation angles of the disk prisms 71, 72, and detects a measuring direction (a sighting direction) of the distance measuring optical axis 28, i.e., a deflection angle and a deflecting direction of the distance measuring optical axis 28 with respect to the reference optical axis O in real time. Therefore, the detection of an angle and a direction (the angle measurement) of the distance measuring optical axis 28 with respect to the reference optical axis O can be carried out in the distance measurement.

A measuring direction detection result (an angle measurement result) is associated with a distance measurement result, and input to the arithmetic control module 54. The arithmetic control module 54 associates the distance measurement result and the angle measurement result with each other and stores them in the main body storage module 55.

By operating the tracking unit 52, the measurement of the object to be measured can be performed while tracking the moving object.

The tracking unit 52 projects the tracking light with the same optical axis as the distance measuring optical axis 28, and receives the reflected tracking light from the object to be measured by a light receiving element (not shown) of the tracking unit. Further, the tracking unit 52 obtains a deviation of the reflected tracking light from a reference position on the light receiving element, and the tracking is performed when the deflection of the distance measuring optical axis 28 is controlled by the optical axis deflector 61 in such a manner that the arithmetic control module 54 makes the deviation to 0.

Further, by performing the distance measurement concurrently with the tracking operation, the measuring unit 51 can measure in real time regarding the object to be measured while moving.

The measuring direction image pickup module 53 has a known relationship with the reference optical axis O, namely, an image pickup optical axis 75 of the measuring direction image pickup module 53 is parallel with the reference optical axis O, and a distance between the optical axes is known. Further, the measuring direction image pickup module 53 is a camera having an angle of view larger than a maximum deflection angle (e.g., ±20°) of the optical axis deflector 61, e.g., an angle of view of 50° to 60°, and the measuring direction image pickup module 53 acquires the image data including a maximum deflection range provided by the optical axis deflector 61. Further, the measuring direction image pickup module 53 is capable of acquiring the moving images or the continuous images.

An image pickup element of the measuring direction image pickup module 53 is a CCD or a CMOS sensor which is an aggregation of pixels, and a position of each pixel on an image element can be identified. For example, each pixel has the pixel coordinates in a coordinate system with the image pickup optical axis 75 as an origin, and a position of the pixel on the image element can be identified by the pixel coordinates. Each pixel outputs the pixel coordinates together with a light receiving signal to the arithmetic control module 54. Further, the image pickup optical axis 75, the tracking optical axis, and the reference optical axis O have a known relationship.

The image processing module 59 performs an image processing, e.g., a edge extraction processing, a feature point extraction, a detection of the object to be measured, an image tracking processing, the image matching, and the like for the image data acquired by the measuring direction image pickup module 53, and creates a gray-scale image from the image data.

The display unit 60 displays an image acquired by the measuring direction image pickup module 53, and displays a measurement state, a measurement result, and the like. It is to be noted that a touch panel may be adopted as the display unit 60 so that it can also function as an operation module.

A description will now be given on an operation in a case where the surveying instrument system 31 according to the present embodiment is used as a total station.

The surveying instrument 33 is installed at a known point (the point of which three-dimensional coordinates are known) via the tripod 32.

The surveying instrument 33 has the tilt detecting device 1. An installation attitude (a tilt) of the surveying instrument 33 to the horizontality can be detected by the tilt detecting device 1. As a result, a leveling operation of the surveying instrument 33 is not required. By correcting a measurement result with the detected tilt, an accurate measurement result is obtained.

The reference optical axis O is directed to the object (a measuring point).

As a method of directing the reference optical axis O to an object to be measured (a measuring point), the distance measuring optical axis 28 is made to coincide with the reference optical axis O. That is, the reference optical axis O is sighted on the object to be measured without deflecting the distance measuring optical axis 28 by the optical axis deflector 61. An image acquired by the measuring direction image pickup module 53 is displayed on the display unit 60, and a worker can confirm a sighted state from the image.

In a state where the surveying instrument 33 is fixed, the optical axis deflector 61 is operated, and the distance measuring optical axis 28 is deflected and finally sighted on the measuring point. At this time a deflection angle and a direction of the deflection angle with respect to the reference optical axis O are detected by the measuring direction detector 56 based on the rotation angles of disk prisms 71 and 72.

The distance measurement is performed at the time when the distance measuring optical axis 28 is sighted on a measuring point, and a direction angle of the distance measuring optical axis 28 at the time of the distance measurement is calculated by the arithmetic control module 54 based on the detection results of the horizontal angle detector 39, the vertical angle detector 48, and the measuring direction detector 56. Further, the three-dimensional coordinates of the measuring point are determined by the arithmetic control module 54 with the use of the distance measurement value and the direction angle.

It is to be noted that, if the surveying instrument 33 tilts to the horizontality, a tilt angle is detected by the tilt detecting device 1, and the determined three-dimensional coordinates is corrected based on the tilt angle.

If there are a plurality of measuring points, the distance measuring optical axis 28 is sequentially sighted on the measuring points, and the measurement is performed. A measurement result of the measuring point is associated with the measuring point, and stored in the storage module 23.

Further, the calibration is performed on the tilt detecting device 1 at a predetermined time interval in a condition where the surveying instrument 33 is stationary, and a drift of the tilt sensor 21 of the tilt detecting device 1 is corrected.

In the measurement operation described above, a stationary measuring point is sighted and measured one by one, and the three-dimensional coordinates are obtained.

Next, a description will be given on a case where the measurement is performed while tracking the object to be measured, such as for a survey setting. Here, the object to be measured is a retroreflective optical member such as a prism, and the object to be measured indicates a measuring point.

The tracking module 52 projects a tracking light, receives a reflected light from the optical member, and performs tracking based on a light reception result. It is to be noted that, as described above, since a tracking optical axis coincides with the distance measuring optical axis 28, the measuring unit 51 also receives the reflected distance measuring light from the optical member, and the measurement of the optical member (the object) is performed in real time while the optical member is moving.

The tracking the object to be measured by the distance measuring optical axis 28 during tracking operation is performed by the optical axis deflector 61 firstly. When a movement range of the object to be measured is within a deflection range of the optical axis deflector 61, a direction of the surveying instrument 33 itself may be fixed.

Alternatively, firstly the distance measuring optical axis 28 is deflected by the optical axis deflector 61 and sights the object to be measured, next the horizontal motor 43 and the vertical motor 47 may be driven and the surveying instrument main body 33 may be rotated while maintaining a sighted state in such a manner that a deflection angle deviation and a deflecting direction deviation between the reference optical axis O and the distance measuring optical axis 28 become 0.

By driving and controlling the horizontal motor 43 and the vertical motor 47 in such a manner that the deflection angle deviation and the deflecting direction deviation between the reference optical axis O and the distance measuring optical axis 28 become 0, it is possible to track over a wide range beyond the deflection range of the optical axis deflector 61.

The deflection of the distance measuring optical axis 28 in the tracking operation is caused by the rotations of the disk prism 71 and the disk prism 72 respectively. Further, the disc prisms 71, 72 are small in size and light in weight, and can be rotated at a high speed and with the high responsiveness by the motors. Therefore, it is possible to improve the responsiveness of the tracking operation and to increase the tracking speed, and a track ability for a high-speed moving object can be improved.

Further, a tilt is detected by the tilt detecting device 1 even during the tracking operation and, if the tilt detecting device 1 detects a tilt, a measurement result provided by the surveying instrument 33 is corrected with a detection result in real time.

It is to be noted that, if the movement of the object is slow, i.e., in a case where the surveying instrument 33 can follow the movement of the object, the tracking is performed in a state where the reference optical axis O and the distance measuring optical axis 28 coincide with each other.

In the foregoing embodiment, the description has been given on the case where the surveying instrument 33 is fixed to the tripod 32, however a worker may hold and carry the surveying instrument 33 alone and measure the measuring points in a state of handheld.

In a state where the worker is carrying, an attitude of the surveying instrument 33 is unstable and the distance measuring optical axis 28 directed to the measuring point also moves, but the distance measuring optical axis 28 can be deflected at a high speed by the optical axis deflector 61, and the measuring point can be tracked. Therefore, even with the hands movement, the distance measuring optical axis 28 can be accurately directed to the measuring point, and the highly accurate measurement can be performed. Further, it is needless to say that a tilt (an attitude) of the surveying instrument 33 can be detected in real time by the tilt detecting device 1 and the optical axis deflector 61 is controlled by the arithmetic control module 54 based on a detection result of the tilt detecting device 1.

Further, even in a state where the worker carries the surveying instrument 33, the object can be tracked.

Further, the above explanation has described the surveying instrument system 31 as the total station, but continuously rotating the disk prisms 71, 72 of the optical axis deflector 61 respectively and individually controlling the rotation speeds and the rotating directions enables performing a scan using the distance measuring optical axis 28 in an arbitrary pattern. Further, when the distance measurement is carried out for each pulsed light during a scan, the point cloud data can be acquired along a scan locus, and the surveying instrument 33 can be also used as a laser scanner.

As described above, by individually controlling the rotations of disk prism 71 and disk prism 72, it is possible to realize the various kinds of two-dimensional scan patterns and methods.

It is to be noted that the above explanation has described the case where the tilt detecting device 1 according to the embodiment is provided in the surveying instrument 33, but the tilt detecting device 1 which measures a tilt may be implemented as a standalone type.

Figure 11:
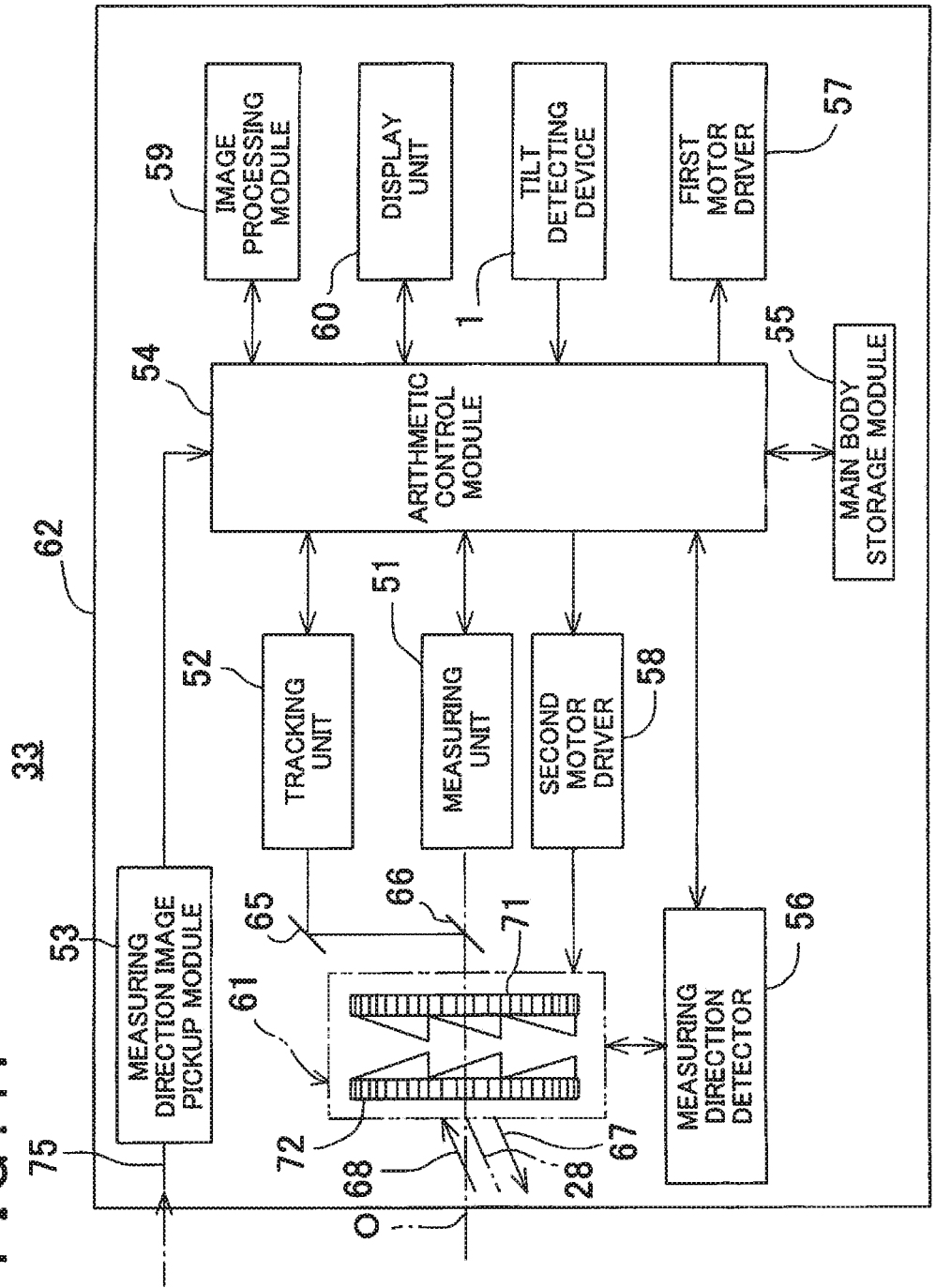
FIG. 11 is a schematical block diagram of the surveying instrument.

Further, the measuring apparatus in which the above-described tilt detecting device is mounted can be a general total station or 3D laser scanner without being restricted to the apparatus shown in FIG. 9 to FIG. 11.

The invention claimed is:

1. A tilt detecting device in which an inner frame is provided inside an outer frame, a tilt detecting unit having a tilt sensor which detects a tilt from the horizontality is provided inside said inner frame, said inner frame is rotatably supported by said outer frame through a first shaft, said tilt detecting unit is rotatably supported by said inner frame through a second shaft orthogonal to said first shaft, comprising: a first encoder which is provided on said first shaft and detects a rotation angle between said outer frame and said inner frame, a second encoder which is provided on said second shaft and detects a rotation angle between said inner frame and said tilt detecting unit, motors provided on said respective shafts so as to rotate said respective shafts, and an arithmetic processing module which drives and controls said respective motors based on a detection result from said tilt sensor, wherein said arithmetic processing module is configured to drive said respective motors based on a signal issued upon detecting a tilt by said tilt sensor such that said tilt sensor detects the horizontality and to calculate a tilt of said outer frame in real time based on the outputs from said first and second encoders when said tilt sensor detects the horizontality, and said arithmetic processing module is configured to determine a stationary state of a tilt detecting device based on a detection result from said tilt sensor, to drive said respective motors, to reverse said tilt detecting unit 180° at least once based on the detection result from said respective encoders in relation to said first shaft and said second shaft, to obtain ½ of a tilt angle difference before and after the reversal as a tilt angle, and to perform the calibration to remove a drift component based on the detection signals output from said tilt sensor before and after the reversal.

2. The tilt detecting device according to claim 1, wherein said tilt sensor is an acceleration sensor.

3. The tilt detecting device according to claim 2, wherein said arithmetic processing module is configured to rotate said tilt detecting unit 90° in relation to at least one of said first shaft and said second shaft based on an output from said encoder on said one shaft in a stationary state of said tilt detecting device, reverse said tilt detecting unit 180° on the other shaft, and perform the calibration of said tilt sensor based on the detection signals output from said tilt sensor before and after the reversal.

4. The tilt detecting device according to claim 2, wherein said arithmetic processing module is configured to, in a state where said tilt detecting device is stationary, a) rotate said tilt detecting unit 90° around said first shaft, b) then rotate the same 90° around said second shaft, c) then rotate the same 90° around said first shaft, d) then rotate the same 90° around said second shaft, e) then rotate the same 90° around said first shaft, f) then rotate the same 90° around said second shaft, g) then rotate the same 90° around said first shaft, h) then rotate the same 90° around said second shaft, perform the calibration of said tilt sensor for said first shaft and said second shaft based on the detection signals of said tilt sensor before and after each 180° reversal of said tilt detecting unit on said first shaft and said second shaft in a process of rotating said tilt detecting unit around each shaft in the same direction in the 90° increments, and perform the calibration for a third shaft based on the detection signals of said tilt sensor before and after the 180° reversal around said third shaft orthogonal to said first shaft and said second shaft.

5. A surveying instrument comprising: a measuring unit for performing an electronic distance measurement, an optical axis deflector for deflecting a distance measuring optical axis and sighting a distance measuring light on a measuring point, a measuring direction detector for detecting a sighting direction of said distance measuring optical axis, the tilt detecting device according to claim 1, and an arithmetic control module, wherein said arithmetic control module is configured to acquire the three-dimensional coordinates of said measuring point based on a distance measurement result of said measuring unit and a detection result of said measuring direction detector, and convert said three-dimensional coordinates into the three-dimensional coordinates with respect to the horizontality based on a detection result of said tilt detecting device.

6. A surveying instrument comprising: a measuring unit for performing an electronic distance measurement, an optical axis deflector for deflecting a distance measuring optical axis and sighting a distance measuring light on a measuring point, a measuring direction detector for detecting a sighting direction of said distance measuring optical axis, the tilt detecting device according to claim 2, and an arithmetic control module, wherein said arithmetic control module is configured to acquire the three-dimensional coordinates of said measuring point based on a distance measurement result of said measuring unit and a detection result of said measuring direction detector, and convert said three-dimensional coordinates into the three-dimensional coordinates with respect to the horizontality based on a detection result of said tilt detecting device.

7. A surveying instrument comprising: a measuring unit for performing an electronic distance measurement, an optical axis deflector for deflecting a distance measuring optical axis and sighting a distance measuring light on a measuring point, a measuring direction detector for detecting a sighting direction of said distance measuring optical axis, the tilt detecting device according to claim 3, and an arithmetic control module, wherein said arithmetic control module is configured to acquire the three-dimensional coordinates of said measuring point based on a distance measurement result of said measuring unit and a detection result of said measuring direction detector, and convert said three-dimensional coordinates into the three-dimensional coordinates with respect to the horizontality based on a detection result of said tilt detecting device.

8. A surveying instrument comprising: a measuring unit for performing an electronic distance measurement, an optical axis deflector for deflecting a distance measuring optical axis and sighting a distance measuring light on a measuring point, a measuring direction detector for detecting a sighting direction of said distance measuring optical axis, the tilt detecting device according to claim 4, and an arithmetic control module, wherein said arithmetic control module is configured to acquire the three-dimensional coordinates of said measuring point based on a distance measurement result of said measuring unit and a detection result of said measuring direction detector, and convert said three-dimensional coordinates into the three-dimensional coordinates with respect to the horizontality based on a detection result of said tilt detecting device.

* * * * *